Figure 1:
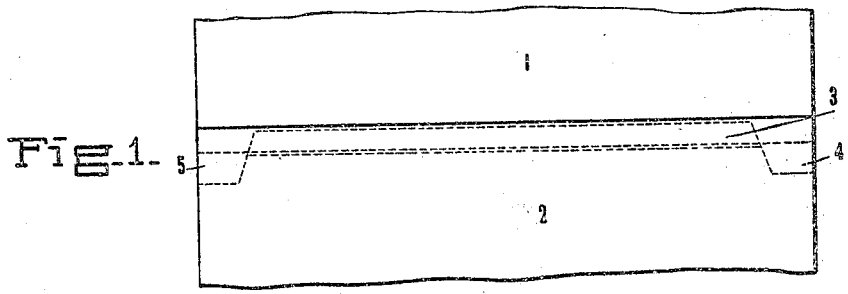

C. W. GRAHAM.
ART OF SOLDERING CAN SEAMS.
APPLICATION FILED MAY 29, 1907.

949,763.

Patented Feb. 22, 1910.

WITNESSES

INVENTOR
C. W. Graham
BY
ATTORNEYS.

UNITED STATES PATENT OFFICE.

CHARLES W. GRAHAM, OF ROME, NEW YORK, ASSIGNOR, BY MESNE ASSIGNMENTS, TO AMERICAN CAN COMPANY, OF NEW YORK, N. Y., A CORPORATION OF NEW JERSEY.

ART OF SOLDERING CAN-SEAMS.

949,763.         Specification of Letters Patent.     Patented Feb. 22, 1910.

Application filed May 29, 1907. Serial No. 376,241.

*To all whom it may concern:*

Be it known that I, CHARLES W. GRAHAM, residing at Rome, in the county of Oneida and State of New York, have invented certain new and useful Improvements in the Art of Soldering Can-Seams, of which the following is a full, clear, and exact description, such as will enable others skilled in the art to which it appertains to make and use the same.

This invention relates to the art of making joints in sheet metal articles, and more specifically to the soldering of a side seam of a can.

One of the objects thereof is to provide a simple and practical art of the above nature capable of being rapidly carried on and characterized by efficient and uniform results.

Other objects will be in part obvious and in part pointed out hereinafter.

The invention accordingly consists in the several steps and relation and order of each of the same with respect to one or more of the others thereof as will be exemplified in the art hereinafter described and the scope of the application of which will be indicated in the following claims.

In order that certain of the features of this invention may be more readily and clearly understood, it may here be noted that in the formation of joints or seams in sheet metal articles having overlapping edges, there is a tendency, particularly if the outer surface be convex, for one of the edges to spring apart from the other, and upon solder entering in the gap thus made to result in an irregular and otherwise objectionable joint. This is particularly the case in connection with seams of the so-called lock and lap type, one form of which is clearly set forth in my co-pending application Serial No. 412,566, filed January 25, 1908, and reference is made thereto for the details of this construction. It may also be noted that certain features herein shown and described are shown, described and claimed in the above application, and accordingly are not claimed herein. In certain seams of this lock and lap type—and by the expression "lock and lap" is meant any seam in which portions of the meeting edges interlock and other portions thereof merely overlap one another—the lapping portions are at the ends of the can body over which the head is to slip, and it will be seen that any undue thickness or irregularity in the joint at this place seriously interferes with the closeness of fit of the head thereon. The above and other defects are remedied in arts of the nature of that hereinafter described.

As illustrative of certain of the steps by which this art may be carried on in one way, there are provided drawings, in which—

Figure 2:
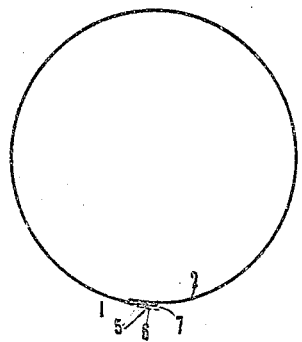
Figure 3:
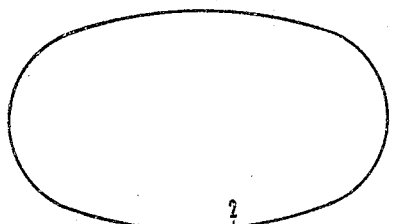

Figure 1 is a diagrammatic view of a lock and lap seam; Fig. 2 is a view of a can, the end portions of the seam of which overlap; and Figs. 3, 4, 5 and 6 are views showing the can appearing in Fig. 1 at successive stages of the art hereinafter described.

Similar reference characters refer to similar parts throughout the several views of the drawings.

Referring now to Fig. 1, there is shown a can body in which the edge portions 1 and 2 are connected by a lock and lap seam set forth in my application above referred to. It may be sufficient to note here that at the portion of the seam 3, the edge interlock one with another, whereas at the end portions 4 and 5 the edges merely overlap and lie one upon another.

Turning now to Fig. 2, in which in order to avoid obscuring the disclosure the portion 5 of the seam shown in Fig. 1 is shown without respect to the interlocking portion 3, it is seen that although the edge portions 1 and 2 are intended to lie smoothly one upon another as shown in full lines, nevertheless there is a tendency by reason of the convexity of the general surface of the can or other reason, for the outer portion to spring away as indicated by the dotted line 6, thus leaving a gap 7 into which the flux and solder may enter. It may here be noted that the term "flux" is used throughout in a broad sense to indicate any matter intended to prepare surfaces for soldering, and that the term "solder" is likewise broadly used as denoting any substance adapted to adhere to and connect adjacent surfaces one with another.

Figure 4:
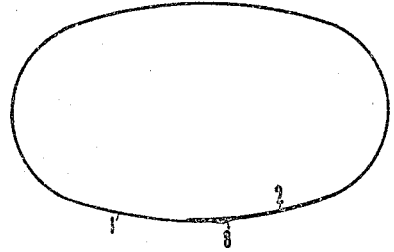
Figure 5:
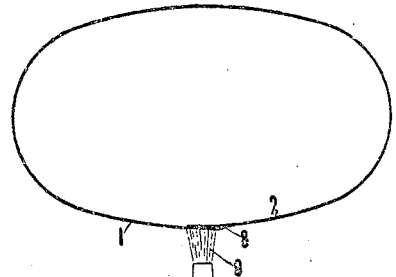
Figure 6:
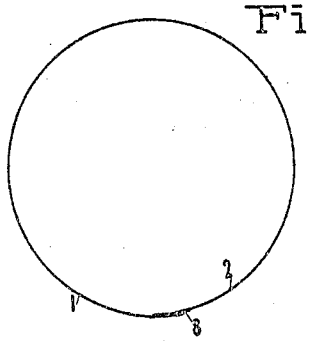

Prior to applying the solder the can body is, if of the round form shown, stretched or distorted into an elliptical conformation, in which it will be seen that the surface of the can at which the joint lies is considerably flattened, and the tendency of the edges to spring apart thus done away with. This flattening may be carried to any desired degree found necessary to achieve the desired result, and it may be noted that the term as used throughout is not to be interpreted literally, as necessarily bringing the meeting edges into a plane surface, but rather as tending to bring about such effect, irrespective of the degree to which the convexity is reduced. The solder 8 is next applied, as shown in Fig. 4, and efficiently seals the joint without tending to enter between the meeting surfaces to any undesirable degree and increasing the effective thickness of the can at this point. With the can maintained in this condition the solder is then permitted to harden, this action being preferably expedited as by bringing a cooling agent 9, as shown in Fig. 5, into operative relation thereto, this cooling agent taking in the present instance the form of a jet of cold air. After the solder is hardened the can body is released and permitted to spring back into its natural form, as indicated in Fig. 6 of the drawings.

It will thus be seen that there is provided an art in which the objects of this invention are achieved and the above-enumerated advantages are, among others, present.

The art or process which is exemplified herein overcomes serious defects in the manufacture of articles of the nature of those with which it deals, and is of such a simple nature that it may be carried on at a high rate of speed without the use of complicated apparatus.

As the art above described could be carried on by the use of radically different apparatus, and as many variations from the details of the art herein set forth could be incorporated without deviation from the broad principles of my invention, I desire that all matter herein set forth or shown in the accompanying drawing shall be interpreted as illustrative and not in a limiting sense. I desire it also to be understood that the language used in the following claims is intended to cover all of the generic and specific features of the invention herein described and all statements of the scope of the invention which, as a matter of language, might be said to fall therebetween, except as to those features which are claimed in my co-pending application referred to.

Having described my invention, what I claim as new and desire to secure by Letters Patent is:—

1. The art of soldering a lap seam upon a curved portion of an article which comprises reducing the curvature of the portion of the article within which the seam lies, applying solder thereto with said portion in said condition of reduced curvature, permitting the solder to harden and releasing the article.

2. The art of soldering the side seam of a can, which comprises holding the portion of the can within which the same is positioned in an unnaturally flattened condition, applying solder to the seam with the can in such flattened condition, permitting the solder to harden, and releasing the can.

3. The art of soldering the side seam of a round can which comprises forcing the can into elliptical form with the seam in the portion of reduced convexity, applying solder to the seam with the can held in such form, permitting the solder to harden and releasing the can.

4. The art of soldering the side seam of a round can which comprises forcing the same into elliptical form with the seam in a portion of reduced convexity, applying flux to the seam, applying solder to the seam and permitting the solder to harden, all with the can in said elliptical form, and releasing the can.

5. The art of soldering a lock and lap side seam of a round can which comprises giving the lap seam portion of the can temporarily the curvature of a portion of an ellipse, applying solder thereto, permitting the solder to harden with the can in such form, and then permitting the can to resume its natural form.

6. The art of soldering a lock and lap seam of a round can which comprises holding the can in temporarily distorted form with the seam in a portion of reduced convexity, applying solder thereto and permitting the solder to harden with the can in such distorted form, and then freeing the can from such distortion.

7. The art of soldering a lock and lap side seam of a round can which comprises forcing the can into elliptical form with the seam at a portion of reduced convexity, applying solder thereto and bringing the seam into operative relation to a hardening agent with the can in elliptical form, and releasing the can.

8. The art of soldering a lock and lap side seam of a round can which comprises forcing the can into elliptical form with the seam at a portion of reduced convexity, applying flux and solder thereto and bringing the seam into operative relation to a hardening agent with the can in elliptical form, and releasing the can.

9. The art of soldering the side seam of a can, which comprises temporarily holding the can in a form other than that which it would assume when free, to bring the overlapping edges into substantially parallel planes, applying solder thereto and permitting the solder to harden while the can is so temporarily held, and then releasing the can from such temporary holding.

10. The art which consists in bringing a can body having a side seam into substantially its final form, with its edge portions connected, then temporarily distorting the can body, then soldering the seam, and finally permitting the can to resume its form first mentioned.

In testimony whereof I affix my signature, in the presence of two witnesses.

CHARLES W. GRAHAM.

Witnesses:
B. M. ANDERSON,
F. B. BEERS.